United States Patent
Nagao

(10) Patent No.: US 10,902,355 B2
(45) Date of Patent: Jan. 26, 2021

(54) APPARATUS AND METHOD FOR PROCESSING INFORMATION AND PROGRAM FOR THE SAME

(71) Applicant: CANON KABUSHIKI KAISHA, Tokyo (JP)

(72) Inventor: Yoshitaka Nagao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 281 days.

(21) Appl. No.: 15/971,752

(22) Filed: May 4, 2018

(65) Prior Publication Data
US 2018/0330285 A1    Nov. 15, 2018

(30) Foreign Application Priority Data

May 12, 2017  (JP) ................................ 2017-095725

(51) Int. Cl.
| | | |
|---|---|---|
| *G06Q 10/04* | (2012.01) | |
| *G06Q 10/06* | (2012.01) | |
| *G06T 7/00* | (2017.01) | |
| *G06M 9/00* | (2006.01) | |

(52) U.S. Cl.
CPC ..... *G06Q 10/04* (2013.01); *G06Q 10/063114* (2013.01); *G06T 7/0008* (2013.01); *G06M 9/00* (2013.01); *G06T 2207/10016* (2013.01)

(58) Field of Classification Search
CPC ........... G06Q 10/063114; G06Q 10/04; G06Q 10/1091; G06M 9/00; G06M 3/08; G06T 2207/10016; G06T 7/0008; G06T 7/77; G06K 9/00778

USPC ......... 702/127, 128; 348/156; 382/103, 104, 382/170; 707/756
See application file for complete search history.

(56) References Cited

U.S. PATENT DOCUMENTS

| | | |
|---|---|---|
| 2004/0091134 A1 | 5/2004 | Long |
| 2006/0269103 A1 | 11/2006 | Brown |
| 2010/0177963 A1 | 7/2010 | Yokomitsu |
| 2011/0231419 A1 | 9/2011 | Papke |
| 2015/0324647 A1 | 11/2015 | Wuethrich |
| 2016/0191865 A1 | 6/2016 | Beiser |
| 2017/0011327 A1* | 1/2017 | Mantri ........... G06Q 10/063114 |

FOREIGN PATENT DOCUMENTS

| | | |
|---|---|---|
| JP | 3826956 B2 | 9/2006 |
| JP | 2014-215917 A | 11/2014 |

* cited by examiner

*Primary Examiner* — John H Le
(74) *Attorney, Agent, or Firm* — Canon U.S.A., Inc. IP Division

(57) ABSTRACT

An information processing apparatus includes a counting unit, a storage control unit, a first determination unit, and a second determination unit. The counting unit counts the number of objects queuing in a waiting line. The storage control unit stores estimated times when the objects enter the waiting line and the number of objects queuing in the waiting line counted by the counting unit in association with each other. The first determination unit determines estimated time when each object exits the waiting line based on the number of objects exiting the waiting line and the number of objects queuing in the waiting line. The second determination unit determines waiting time of each object in the waiting line based on the estimated time when the object enters the waiting line and the estimated time when the object exits the waiting line.

15 Claims, 13 Drawing Sheets

FIG. 5A

| COUNT TIME T1 (HH:MM:SS) | NUMBER OF WAITING OBJECTS |
|---|---|
| 11:01:30 | 8 |
| 11:02:00 | 9 |
| 11:02:30 | 9 |
| 11:03:00 | 8 |
| 11:03:30 | 6 |
| ... | ... |

← A HAS ARRIVED

FIG. 5B

| EXITING DETECTED TIME T2 (HH:MM:SS) | ORDER OF A |
|---|---|
| 11:01:10 | |
| 11:01:35 | 7 |
| 11:02:21 | 6 |
| 11:02:30 | 5 |
| 11:03:01 | 4 |
| 11:03:15 | 3 |
| 11:03:45 | 2 |
| 11:04:40 | 1 |
| 11:05:30 | 0 |
| 11:06:20 | |
| ... | |

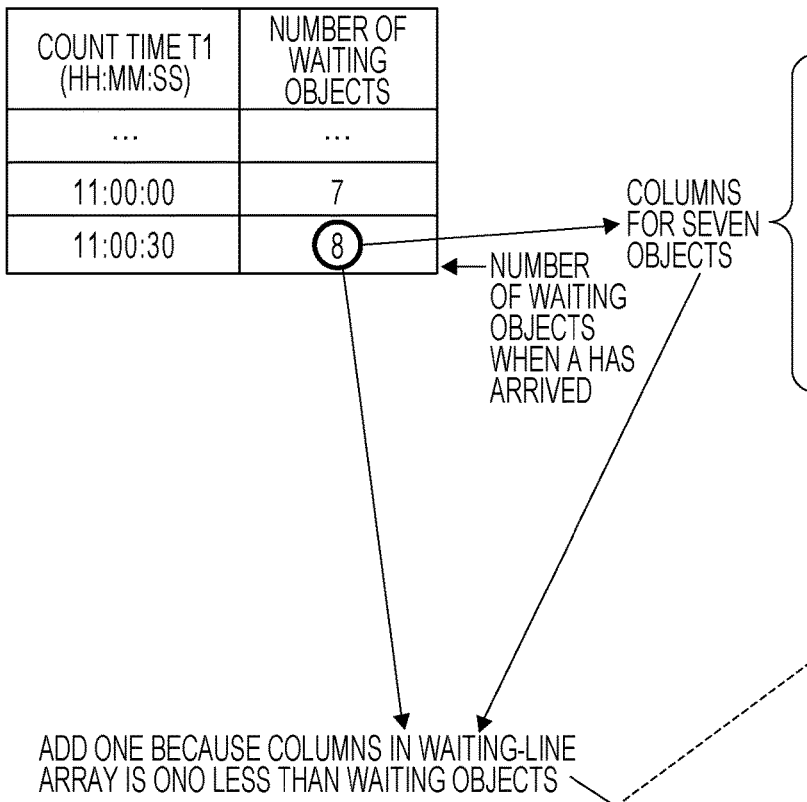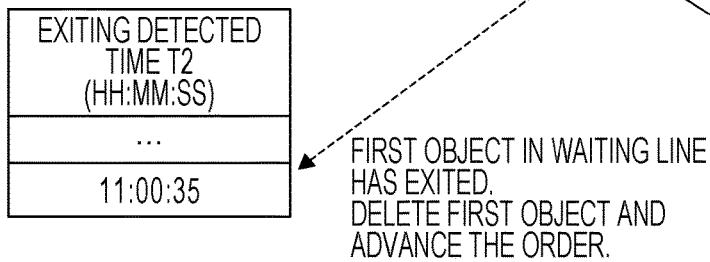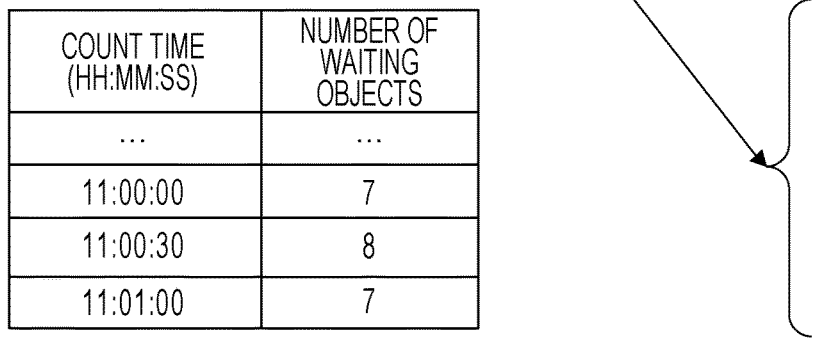

FIG. 10A

| COUNT TIME (HH:MM:SS) | NUMBER OF WAITING OBJECTS |
|---|---|
| ... | ... |
| 11:00:00 | 7 |
| 11:00:30 | 8 |
| 11:01:00 | 7 |
| 11:01:30 | ⑤ |

COLUMNS FOR SEVEN OBJECTS ↓
SET FLAG 1 FOR COLUMN OF FIVE OBJECTS

FIG. 10B
WAITING-LINE ARRAY AT 11:01:30

| ARRIVAL TIME T1 (HH:MM:SS) | FLAG |
|---|---|
| 10:58:15 | 0 |
| 10:58:40 | 0 |
| 10:58:50 | ① |
| 10:59:15 | 0 |
| 10:59:40 | 0 |
| 10:59:50 | ① |
| 11:00:15 | 0 |

FIG. 10C

| COUNT TIME (HH:MM:SS) | NUMBER OF WAITING OBJECTS |
|---|---|
| ... | ... |
| 11:00:00 | 7 |
| 11:00:30 | 8 |
| 11:01:00 | 7 |
| 11:01:30 | 5 |
| 11:02:00 | ⑥ |

REDUCE ONE FLAG 1 AND SET FLAG 1 FOR COLUMN OF SIX OBJECTS

FIG. 10D
WAITING-LINE ARRAY AT 11:02:00

| ARRIVAL TIME T1 (HH:MM:SS) | FLAG |
|---|---|
| 10:58:15 | 0 |
| 10:58:40 | 0 |
| 10:58:50 | ⓪ |
| 10:59:15 | 0 |
| 10:59:40 | 0 |
| 10:59:50 | 1 |
| 11:00:15 | 0 |

FIG. 10E

| COUNT TIME (HH:MM:SS) | NUMBER OF WAITING OBJECTS |
|---|---|
| ... | ... |
| 11:00:00 | 7 |
| 11:00:30 | 8 |
| 11:01:00 | 7 |
| 11:01:30 | 5 |
| 11:02:00 | 6 |
| 11:02:30 | ⑧ |

REDUCE ONE FLAG 1 AND ADD ONE NEW ARRIVAL TIME TO FORM COLUMN OF EIGHT OBJECTS

FIG. 10F
WAITING-LINE ARRAY AT 11:02:30

| ARRIVAL TIME T1 (HH:MM:SS) | FLAG |
|---|---|
| 10:58:15 | 0 |
| 10:58:40 | 0 |
| 10:58:50 | 0 |
| 10:59:15 | 0 |
| 10:59:40 | 0 |
| 10:59:50 | ⓪ |
| 11:00:15 | 0 |
| 11:02:15 | 0 |

APPARATUS AND METHOD FOR PROCESSING INFORMATION AND PROGRAM FOR THE SAME

BACKGROUND

Field

The present disclosure relates to an information processing apparatus, a method for processing information, and a program.

Description of the Related Art

There is a known system for calculating a waiting time from an average time for services and the number of waiting persons or issuing numbered tickets and calculating an actual waiting time from the reception time and an actual accepting time.

For example, Japanese Patent No. 3826956 discloses a system for calculating an actual waiting time in restaurants, amusement facilities, banks, and so on by inputting waiting start information and waiting end information with an input device.

Japanese Patent Laid-Open No. 2014-215917 discloses a waiting-line estimation system that enables provision of an average waiting time and a queue length necessary for using an external terminal for each time based on the log of the service of the external terminal without separately acquiring the time the customer has queued at the end of the waiting line.

The above-described systems are based on the premise that the terminal of the system is operated by a customer or staff to record the time. For example, in the case of a queue waiting for a taxi, it takes time to input the time to an input device, which is unpractical. Face authentication or the like can be used to identify individuals by acquiring images at the entrance/exit of a queue area, such as an entrance or a platform, and to calculate waiting times. However, face authentication requires a relatively high accuracy face image. For that reason, in the case where a person passes with, for example, the person's head down, the waiting time cannot be measured.

SUMMARY

The present disclosure provides an information processing apparatus including a counting unit, a storage control unit, a first determination unit, and a second determination unit. The counting unit counts the number of objects queuing in a waiting line. The storage control unit stores estimated times when the objects enter the waiting line and the number of objects queuing in the waiting line counted by the counting unit in association with each other, wherein the estimated times are based on times when the number of objects is counted by the counting unit. The first determination unit determines estimated time when each object exits the waiting line based on the number of objects exiting the waiting line and the number of objects queuing in the waiting line. The second determination unit determines waiting time of each object in the waiting line based on the estimated time when each object enters the waiting line and the estimated time when each object exits the waiting line.

Further features will become apparent from the following description of exemplary embodiments with reference to the attached drawings.

BRIEF DESCRIPTION OF THE DRAWINGS

FIG. 5A is a diagram illustrating an example of a time-series processing for calculating waiting time according to the first embodiment.

FIG. 5B is a diagram illustrating an example of a time-series processing for calculating waiting time according to the first embodiment.

FIG. 9A is a diagram illustrating an example of the result of time-series processing for calculating waiting time according to the second embodiment.

FIG. 9B is a diagram illustrating an example of the result of time-series processing for calculating waiting time according to the second embodiment.

FIG. 9C is a diagram illustrating an example of the result of time-series processing for calculating waiting time according to the second embodiment.

FIG. 9D is a diagram illustrating an example of the result of time-series processing for calculating waiting time according to the second embodiment.

FIG. 9E is a diagram illustrating an example of the result of time-series processing for calculating waiting time according to the second embodiment.

FIG. 9F is a diagram illustrating an example of the result of time-series processing for calculating waiting time according to the second embodiment.

FIG. 10A is a diagram illustrating an example of the result of time-series processing for calculating waiting time according to the second embodiment.

FIG. 10B is a diagram illustrating an example of the result of time-series processing for calculating waiting time according to the second embodiment.

FIG. 10C is a diagram illustrating an example of the result of time-series processing for calculating waiting time according to the second embodiment.

FIG. 10D is a diagram illustrating an example of the result of time-series processing for calculating waiting time according to the second embodiment.

FIG. 10E is a diagram illustrating an example of the result of time-series processing for calculating waiting time according to the second embodiment.

FIG. 10F is a diagram illustrating an example of the result of time-series processing for calculating waiting time according to the second embodiment.

DESCRIPTION OF THE EMBODIMENTS

Embodiments of the present disclosure will be described hereinbelow with reference to the drawings.

First Embodiment

Figure 1:
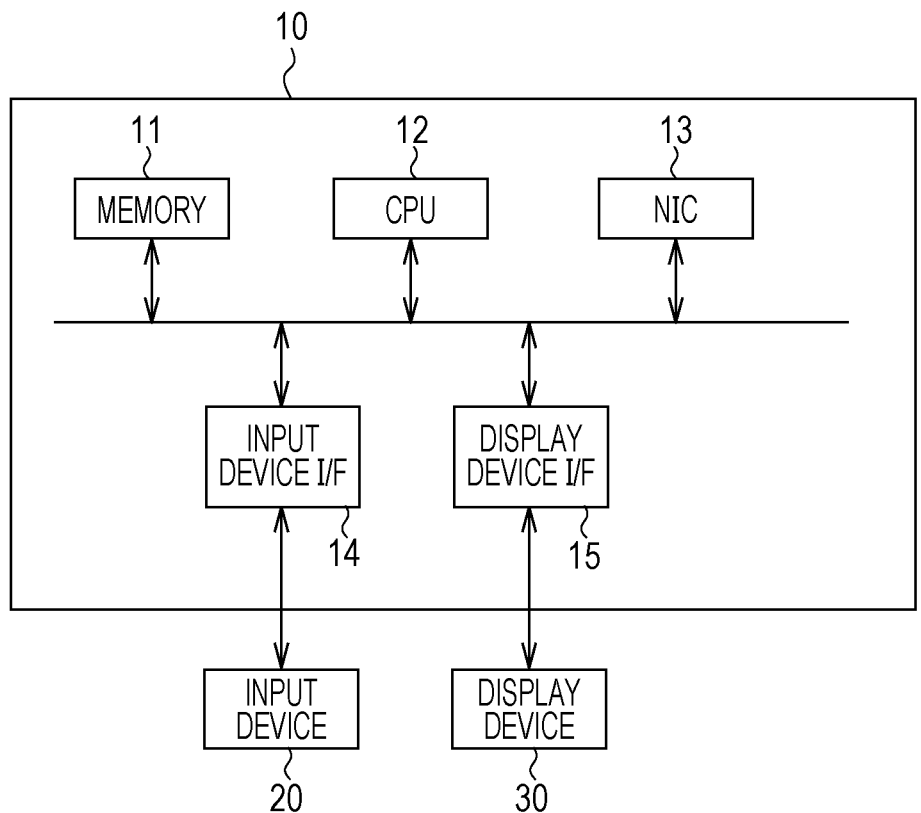
FIG. 1 is a diagram illustrating an example of the hardware configuration of an information processing apparatus.

FIG. 1 is a diagram illustrating an example of the hardware configuration of an information processing apparatus 10.

The information processing apparatus 10 includes, as hardware configuration, a memory 11, a central processing unit (CPU) 12, a network interface card (NIC) 13, an input device interface (I/F) 14, and a display device I/F 15.

The memory 11 is a storage unit that stores a program, set data, thresholds, images captured by a camera. The CPU 12 is a central processing unit that controls processing of the information processing apparatus 10. The NIC 13 connects the information processing apparatus 10 to a network. The input device I/F 14 is an interface that connects an input device 20 to the information processing apparatus 10. The display device I/F 15 is an interface that connects a display device 30 to the information processing apparatus 10. In the present embodiment, the information processing apparatus 10, the input device 20, and the display device 30 are separate units, but the input device 20 and the display device 30 can be integrated in the information processing apparatus 10.

Figure 2:
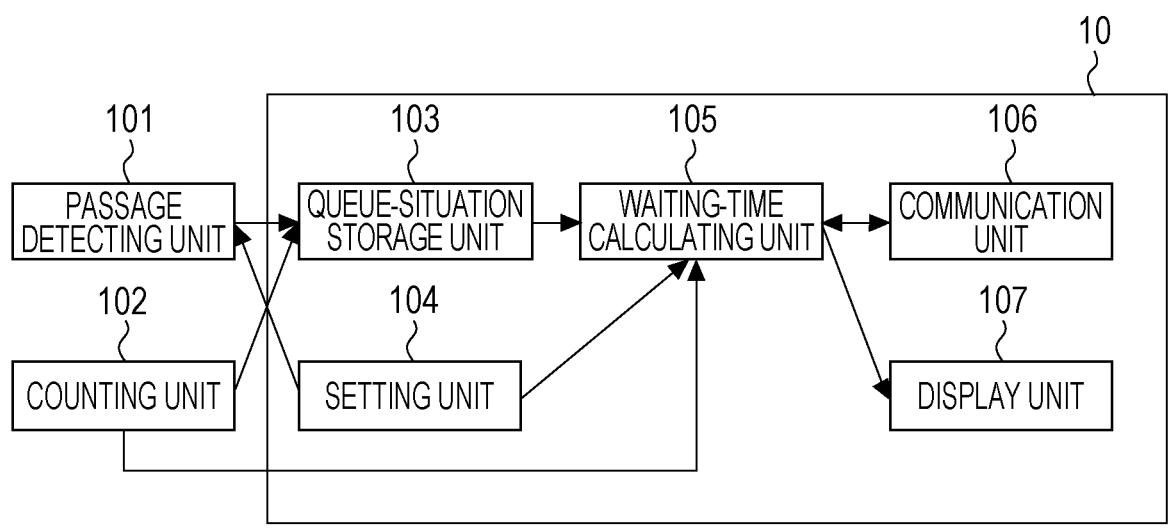
FIG. 2 is a diagram illustrating an example of the configuration of a waiting-time measuring system of a first embodiment.

FIG. 2 is a diagram illustrating an example of the functional configuration of a waiting-time measuring system of a first embodiment.

A passage detecting unit 101 detects the passage of objects constituting a queue. The passage detecting unit 101 is disposed at a position where measurement of the waiting time of the objects is to be terminated. The passage detecting unit 101 is commonly disposed at the head of a waiting line or a position where the objects exit the queue area. When a waiting time to the middle of the waiting line is to be measured, the passage detecting unit 101 can be disposed at the middle of the waiting line. Examples of the passage detecting unit 101 include a passage sensor using infrared rays or the like and a camera including an image analyzing function for detecting the passage of an object using an image. Alternatively, the passage detecting unit 101 can be implemented as software in the information processing apparatus 10. In this case, the passage detecting unit 101 detects the passage of an object by processing an image captured by a camera. The passage detecting unit 101 can detect the passage of an object using a combination of the above methods.

A counting unit 102 calculates the number of objects in a target waiting line detected by the passage detecting unit 101.

The counting unit 102 can be mounted to a camera including the image analyzing function for counting the number of objects using an image. The counting unit 102 can be mounted to a positional-information measuring system using radio waves or the like. For example, the counting unit 102 counts the number of objects in the queue by using an access point of wireless LAN to search for tags or mobile terminals of the objects in the queue, which use the wireless LAN. In the case where the counting unit 102 is implemented as software of the information processing apparatus 10, the counting unit 102 can analyze an image received from the camera and count the objects. The counting unit 102 can count the objects using a combination of the above methods.

The counting unit 102 counts the objects at a predetermined timing. While the counting unit 102 commonly counts the objects at predetermined intervals, the counting unit 102 can count the objects based on the timing at which the passage of the objects is detected by the passage detecting unit 101.

A queue-situation storage unit 103 stores a combination of the time of arrival at a waiting-time measuring area (estimated arrival time) calculated from the time when objects are counted by the counting unit 102 and the number of objects at that time in the memory 11 or the like for each time. The number of objects at that time is assumed to be the waiting order of an object that starts to queue at the arrival time.

The last object may not always arrive just at the count time. Therefore, setting the arrival time to an intermediate time between the count time and the preceding count time reduces or eliminates statistic bias in error. For example, in the case where the counting unit 102 counts objects at regular intervals, if the time before the count time by one-half of the cycle is set as the time of arrival at the waiting-time measuring area, the obtained waiting times are distributed around an actual waiting time.

The queue-situation storage unit 103 typically stores the arrival time and the number of objects for each count. When no object is detected by the passage detecting unit 101 between the latest count and the previous count and when the number of objects is the same between the latest count and the previous count, the queue-situation storage unit 103 can assume that no objects has arrived at the waiting-time measuring area. That is, the queue-situation storage unit 103 may not store the time and the number of objects.

A setting unit 104 sets count timing and display timing based on a user operation or the like. Storing the count timing and the display timing in the memory 11 or the like eliminates the need for inputting the timing each time, thus improving user convenience.

When the passage of an object is detected by the passage detecting unit 101, a waiting-time calculating unit 105 subtracts the passage number from the number of objects stored in the memory 11 or the like by the queue-situation storage unit 103. This process advances the order of an object added to the waiting line at each time. The waiting-time calculating unit 105 performs the process every time the passage of an object is detected by the passage detecting unit 101. The waiting-time calculating unit 105 takes the time when the number of objects becomes less than or equal to 0 as an exit time (estimated exit time) when the object exits the waiting line and takes the difference between the exit time and the arrival time as a waiting time.

A communicating unit 106 transmits the result calculated by the waiting-time calculating unit 105 to a terminal or the like via the NIC 13 or the like. The information processing apparatus 10 can be connected to the terminal or the like via a wired or wireless connection.

A display unit 107 displays the waiting time calculated by the waiting-time calculating unit 105 on the display device 30 or the like based on the interval set by the setting unit 104.

The units 103 to 107 can be implemented in a single information processing apparatus or can be implemented as a system in which a plurality of information processing apparatuses are connected. One or both of the units 101 and 102 can be implemented in a single information processing apparatus or the like.

The units 103 to 107 can be implemented in an information processing apparatus or the like as hardware or software. All or part of the units 103 to 107 can be implemented via a combination of hardware and software. The units 103 to 107 can be implemented in a plurality of information processing apparatuses or systems as necessary.

Figure 3:
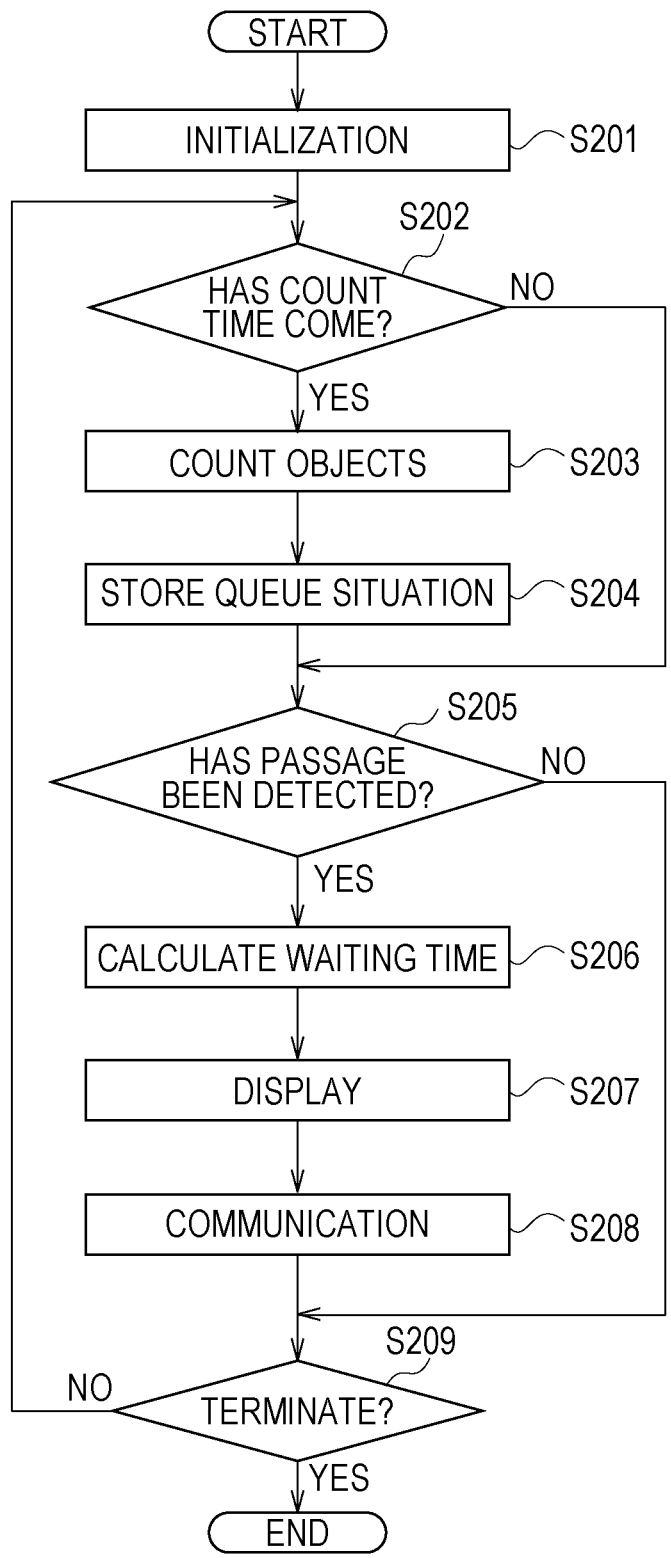
FIG. 3 is a flowchart illustrating an example of the information processing of the first embodiment.
Figure 8:
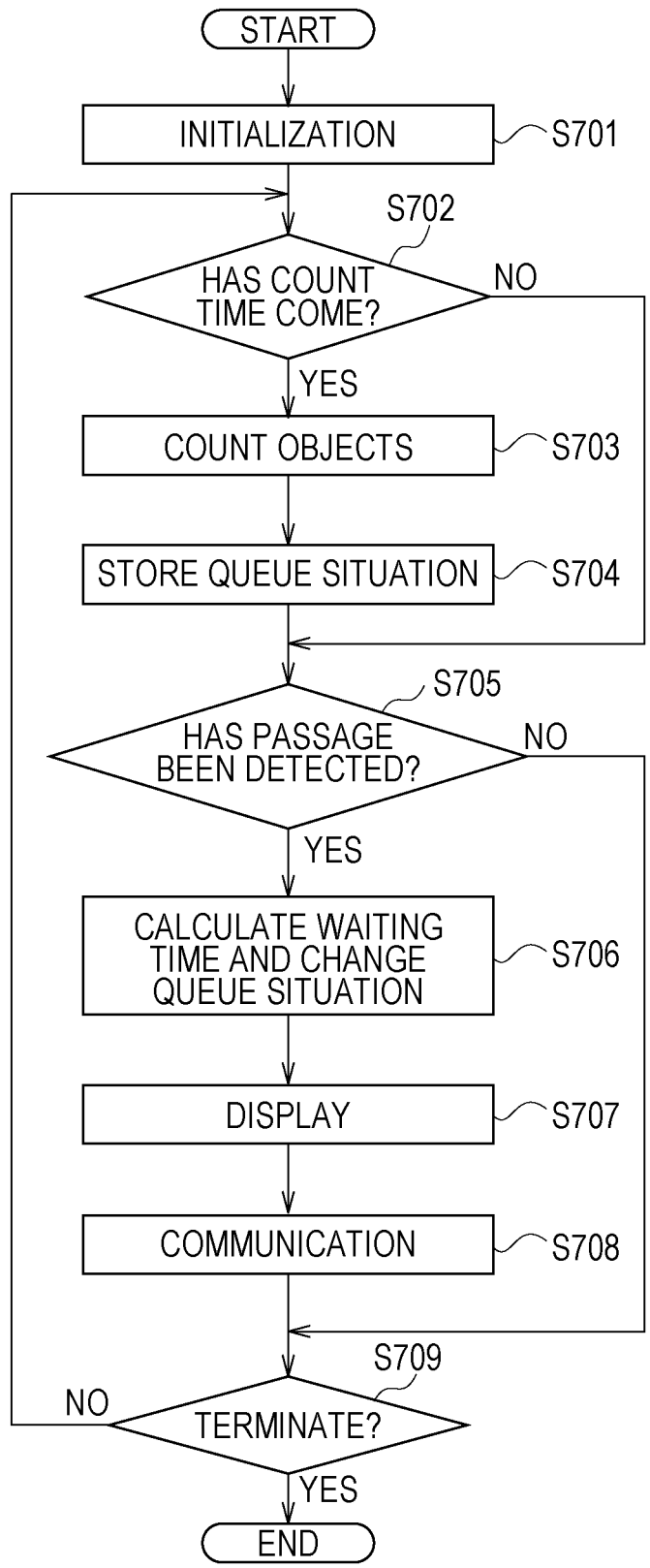
FIG. 8 is a flowchart illustrating an example of the information processing of the second embodiment.

In the following embodiments, the functional configurations of the information processing apparatus 10 illustrated in FIGS. 2 and 6 and the flowcharts illustrated in FIGS. 3 and 8 are implemented by the CPU 12 executing the processes based on programs stored in the memory 11. In such configurations, the set conditions are stored in the memory 11 or the like.

In the present embodiment, the specific objects are human bodies, but are not limited thereto. For example, when the user changes the settings and so on, the passage detecting unit 101 and the counting unit 102 can recognize specific objects desired by the user.

FIG. 3 is a flowchart illustrating an example of the information processing of the first embodiment.

The process of the flowchart in FIG. 3 is started, for example, when the waiting-time measuring system is started.

In S201, the setting unit 104 sets set conditions, such as the timing of measurement of waiting time and display timing, which are input via the input device 20 or the like. In the case where the set conditions are stored in advance in the memory 11 or the like, the setting unit 104 reads and sets the set conditions stored in the memory 11 or the like.

In S202, the counting unit 102 determines whether the set timing for counting has come. For example, if the counting unit 102 determines that the set timing has come (S202: YES), the process proceeds to S203 and if the set timing has not yet come (S202: NO), the process proceeds to S205.

In S203, the counting unit 102 counts the number of objects in a target area. The process in S203 is an example of counting the number of objects in the waiting line from an image captured by a camera.

In S204, the queue-situation storage unit 103 stores a combination of an arrival time calculated from the time counted by the counting unit 102 and the number of objects calculated by the counting unit 102 associated with each other in the memory 11 or the like. The process in S204 is an example of determining the time when an object enters the waiting line based on the time when the number of objects is counted. The process in S204 is an example of storing the time when the object enters the waiting line in association with the number of objects in the waiting line.

In S205, the passage detecting unit 101 determines whether the passage of an object has been detected based on a signal or the like from a passage sensor. If the passage detecting unit 101 detects the passage of an object (S205: YES), the process proceeds to S206, and if not (S205: NO), the process proceeds to S209. The process in S205 is an example of detecting an object that has exited the waiting line.

In S206, the waiting-time calculating unit 105 calculates the actual value of the waiting time based on the set conditions set in S201. At that time, the waiting-time calculating unit 105 subtracts the number of waiting objects for an object for which calculation of the waiting time has not ended every time passage is detected by the passage detecting unit 101 from the situation at arrival stored in the memory 11 or the like by the queue-situation storage unit 103. When the number of waiting objects reaches 0, the waiting-time calculating unit 105 determines the difference between an exit time detected by the passage detecting unit 101 at that time and an arrival time calculated from the time counted by the counting unit 102 as the waiting time. The process in S206 is an example of determining the time when the object exits the waiting line based on the number of objects exiting the waiting line and the number of objects in the waiting line. The process in S206 is an example of a second determination process determining the waiting time of the object in the waiting line based on the time when the object enters the waiting line and the time when the object exits the waiting line.

The waiting-time calculating unit 105 performs a process of providing the thus-calculated waiting time into a display form, such as data by arrival time or exit time, a histogram in a certain time period, or a mean value or a moving mean time for each time.

In S207, the display unit 107 displays the waiting time obtained in S206 on the display device 30 or the like. The display unit 107 also displays the past measured waiting times, passage frequency, and other data based on the set conditions stored in the memory 11.

The process in S207 is an example of outputting the determined waiting time of the object in the waiting line.

In S208, the communicating unit 106 determines whether to transmit the waiting time obtained in S206 to an external device based on the set information stored in the memory 11, a request from the external device, and so on. The communicating unit 106 transmits the waiting time to the external device after determining to transmit the waiting time obtained in S206 to the external device. For example, the external device displays information on the received waiting time or the like on a display of the external device.

The process in S208 is an example of outputting the determined waiting time of the object in the waiting line.

In S209, the waiting-time calculating unit 105 determines whether to terminate the process of calculating the waiting time. If the waiting-time calculating unit 105 performs the process of calculating the waiting time based on the set conditions as needed (S209: NO), the process returns to S202, and if the waiting-time calculating unit 105 terminates the process of calculating the waiting time (S209: YES), the process in FIG. 3 ends. While steps S203, S204, S206, and S207 have been described as a series of processes, this is not seen to limit the present disclosure. For example, the process from S203 to S204 and the process from S206 to S207 can be performed in parallel. For example, in S204, the queue-situation storage unit 103 stores a combination of the arrival time and the number of objects in a database, a file, or the like. In S206, the waiting-time calculating unit 105 reads the information from the database or file and calculates a waiting time. The communicating unit 106 or the display unit 107 can respectively transmit or display the calculated waiting time and so on.

Next, an example of the operation of the waiting-time measuring system when the process of the flowchart in FIG. 3 is executed will be described.

Figure 4A:
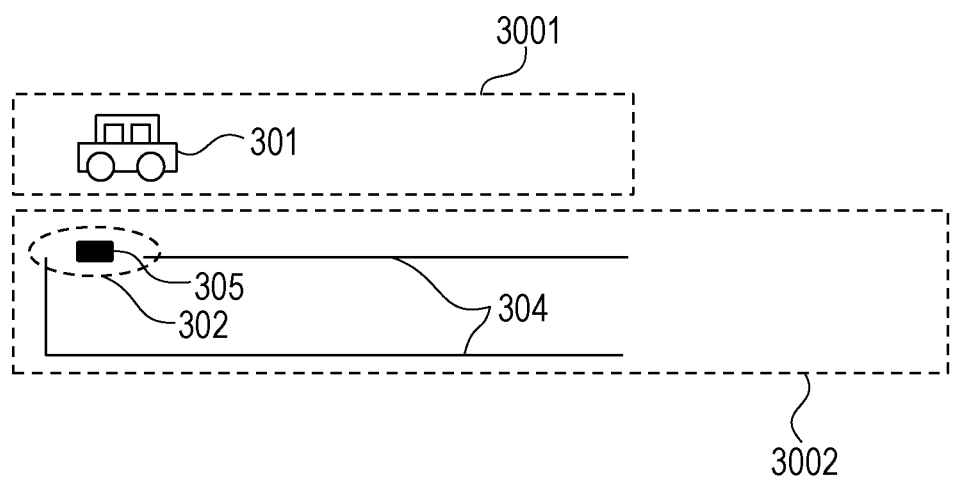
FIG. 4A is a diagram illustrating an application of the waiting-time measuring system of the first embodiment.
Figure 4B:
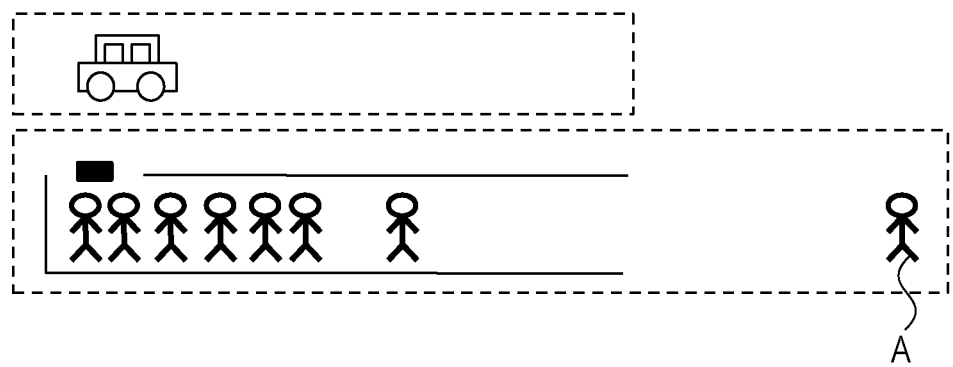
FIG. 4B is a diagram illustrating an application of the waiting-time measuring system of the first embodiment.

FIGS. 4A and 4B are diagrams for illustrating an example in which the process of the waiting-time measuring system is applied to a waiting line queuing at a taxi stand.

FIG. 4A is a diagram illustrating a state in which a taxi 301 has arrived at a taxi arrival area 3001 indicated by a broken line.

In a taxi waiting area 3002 indicated by a broken line, an exit 302 where people take a taxi is present. The area 3002 is specified by a guide pole 304 to guide alignment of the queue. The guide pole 304 is provided for illustration purposes, and anything that enables specifying the area 3002, guide alignment of the queue, and clearly shows the entrance of the area 3002, for example, a line on the floor, is applicable.

An infrared sensor 305, which is an example of the passage detecting unit 101, is disposed above the exit 302. A camera that images the area 3002 in which a queue can be formed is also disposed. The counting unit 102 counts the number of objects by analyzing an image from the camera.

The example in FIG. 4A illustrates a state in which no waiting line is formed yet, so that no people are present in the area 3002.

FIG. 4B is a diagram illustrating a state in which a person who is going to get into a taxi is going to enter the queue area 3002.

Suppose that person A arrives at 11:01:20, and the number of persons in the waiting line is seven.

FIGS. 5A and 5B are diagrams illustrating an example of a method for calculating waiting time. In FIG. 5A, the objects in the area 3002 are counted at intervals of 30 seconds in the above state. An increase in the number of objects due to the arrival of person A is determined by count processing based on an image captured at 11:01:30. When person A arrives, person A is $8^{th}$ in order to get a taxi, and the arrival time (the time person A is queued) is during 30 seconds between the previous count time and the present count time. The queue-situation storage unit 103 stores 11:01:15, which is between the previous count time and the present count time, as the time when person A arrives at the waiting line in association with the number of objects (object count) in the memory 11 or the like.

FIG. 5B is an exit detection time around the count time in FIG. 5A. The waiting-time calculating unit 105 decreases the number of waiting objects every time an exit is detected after the arrival time of person A. Since the time when the order of person A reaches 0 indicates the exit of person A, 11:05:30 is the time when person A exits (got into a taxi).

Therefore, the waiting time of person A is expressed as 11:05:30−11:01:15=4 minutes 15 seconds.

In the above example, the queue-situation storage unit 103 determines the arrival time as an intermediate time between the previous count time and the present count time. Although the arrival time can be determined based on the timing of counting in the viewpoint of error distribution, the queue-situation storage unit 103 can use the count time as the arrival time as it is.

The queue-situation storage unit 103 can also store data that is a combination of the time of arrival at the waiting-time measuring area and the number of objects at that time in a database, such as the memory 11. The waiting-time calculating unit 105 can obtain the waiting time, for example, by querying the database in a structured query language (SQL) to extract records sorted by arrival time.

If the number of counted persons is two or more larger than the maximum value of the order at that time, it means that a plurality of persons queue from the previous count time to the current count time. Accordingly, in that case, the queue-situation storage unit 103 assumes that a plurality of persons queue and stores the time when each person queues (arrival time) and the order thereof in the memory 11 or the like.

For example, in FIG. 5A, the count in an image obtained at 11:02:00 is 9, but before that, person A enters the area 3002 at 11:01:15, and one person gets into a taxi at 11:01:35 to exit the queue area 3002, so that the maximum value of the order becomes 7. This means that two persons have arrived from 11:01:30 until 11:02:00.

Likewise, the queue-situation storage unit 103 stores "arrival time: 11:01:45, order: 8" and "arrival time: 11:01:45, order: 9" in the memory 11 or the like. Then the waiting-time calculating unit 105 can calculate the waiting time based on the information stored by the queue-situation storage unit 103.

In the above example, the queue-situation storage unit 103 takes the same time as the arrival time to be stored. Alternatively, the queue-situation storage unit 103 can store times obtained by equally dividing the count interval based on the number of persons, such as "arrival time: 11:01:40, order: 8" and "arrival time: 11:01:50, order: 9". This reduces the mean value of errors.

Second Embodiment

Figure 6:
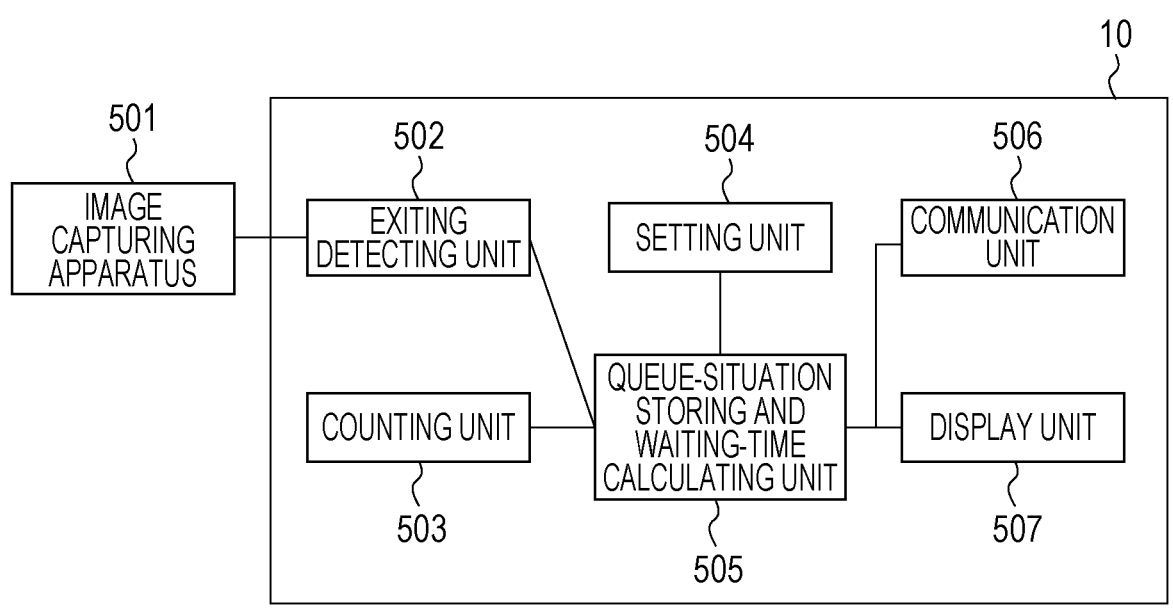
FIG. 6 is a diagram illustrating an example of the configuration of a waiting-time measuring system of a second embodiment.

FIG. 6 is a diagram illustrating an example of the functional configuration of a waiting-time measuring system of a second embodiment.

An exiting detecting unit 502 can be any detecting unit that detects exiting of an object from the queue area and can be similar to the passage detecting unit 101 of the first embodiment. In the present embodiment, the exiting detecting unit 502 detects the passage of an object from an image captured by an image capturing apparatus (camera) 501. The image capturing apparatus 501 is disposed to capture an image of the entire waiting line. The exiting detecting unit 502 obtains a moving image from the image capturing apparatus 501 and detects the passage of an object at a certain position based on the temporal change of the object detected by processing and analyzing the images of individual frames. The position can be set using a line. The exiting detecting unit 502 can detect the passage of an object at a plurality of positions by setting a plurality of lines for detecting the passage.

A counting unit 503 detects objects from an image captured by the image capturing apparatus 501 and counts the number of the objects. For example, an image captured by the image capturing apparatus 501 disposed at a taxi stand or the like can contain a person other than the persons in the taxi waiting line. In such a case, the counting unit 503 can analyze only a predetermined area in the image captured by the image capturing apparatus 501 or count the objects therein.

A setting unit 504 sets the timing of counting and the timing of display based on a user operation or the like. The setting unit 504 also sets a passage line for detecting the passage of an object detected by the exiting detecting unit 502 from an image captured by the image capturing apparatus 501 and sets a count area for determining whether the object detected from the image captured by the image capturing apparatus 501 with the counting unit 503. The setting unit 504 does not need to input the set information and so on every time by storing the information in the memory 11 or the like, thus improving user convenience.

A queue-situation storing and waiting-time calculating unit 505 obtains the number of objects at a timing set by the setting unit 504 from the counting unit 503 and stores the arrival time and so on in a waiting line array stored therein based on the time and the number of objects. When an object is detected by the exiting detecting unit 502, the queue-situation storing and waiting-time calculating unit 505 calculates a waiting time from the arrival time and the exit time based on the supposition that the object at the arrival time stored in the waiting line array has exited the waiting line area. The queue-situation storing and waiting-time calculating unit 505 also performs a process of advancing the arrival time stored in the waiting line array forward.

A communicating unit 506 transmits the details of the result estimated by the queue-situation storing and waiting-time calculating unit 505 to a device, such as a terminal, via the NIC 13 or the like. The information processing apparatus 10 can be connected to the terminal or the like via a wired or wireless connection.

A display unit 507 displays the waiting time calculated by the queue-situation storing and waiting-time calculating unit 505 on the display device 30 or the like based on intervals set by the setting unit 504.

Figure 7:
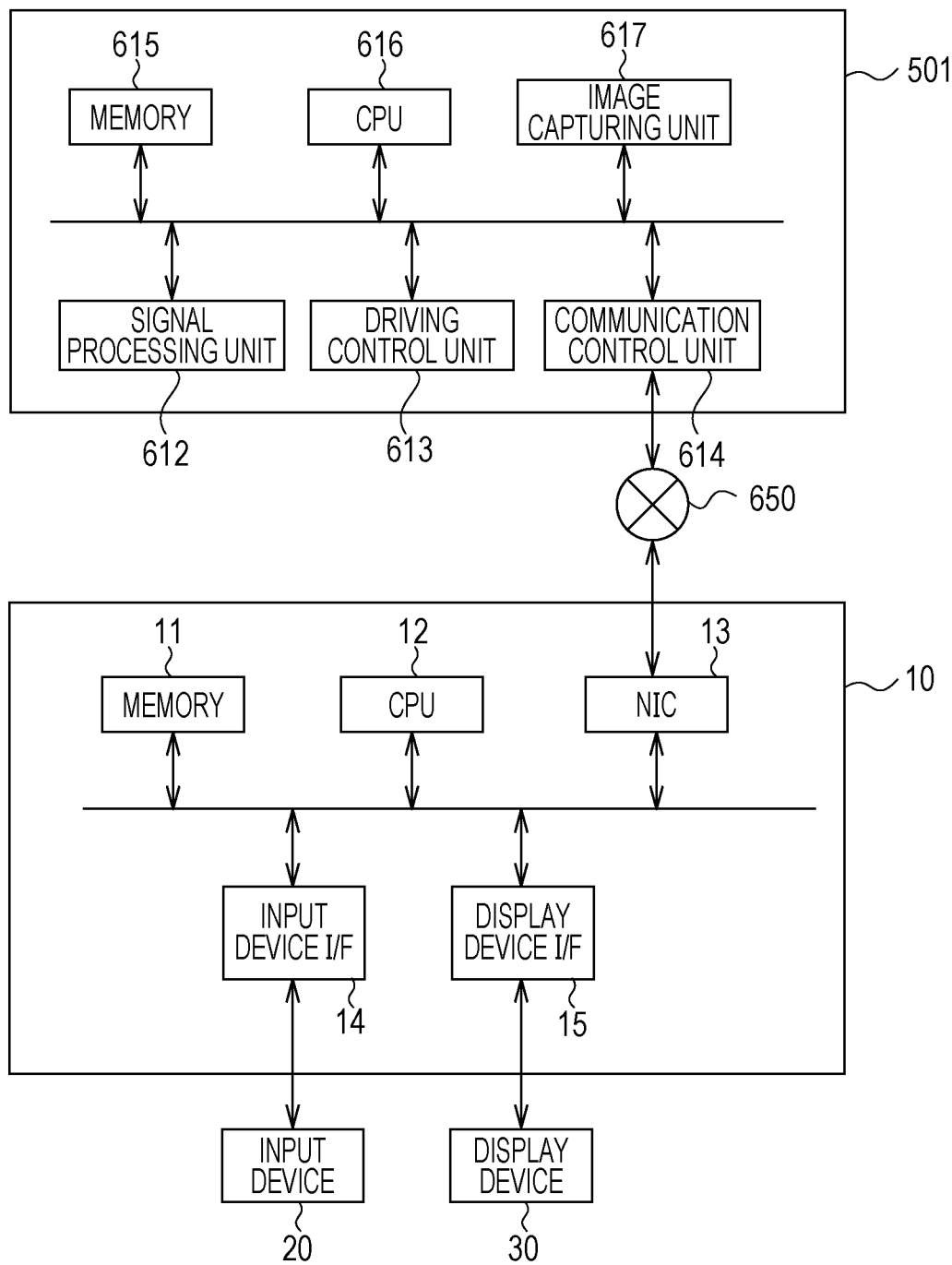
FIG. 7 is a diagram illustrating an example of the hardware configuration of the waiting-time measuring system of the second embodiment.

FIG. 7 is a diagram illustrating an example of the hardware configuration of the waiting-time measuring system of the second embodiment.

The image capturing apparatus 501 performs image capturing. The information processing apparatus 10 receives an image from the image capturing apparatus 501 and calculates a waiting time and so on. The information processing apparatus 10 drives the image capturing apparatus 501 and displays the captured image. Since the hardware configuration of the information processing apparatus 10 is the same as the hardware configuration in FIG. 1, its description will be omitted herein.

A network 650 connects the image capturing apparatus 501 and the information processing apparatus 10 together. The network 650 includes a router, switches, and cables that satisfy a communication standard, such as Ethernet. In the present embodiment, any communication standard, any size, and any configuration that enable the communication between the image capturing apparatus 501 and the information processing apparatus 10 can be used. For example, the network 650 can be the Internet, a cable local area network (LAN), a wireless LAN, a wide area network (WAN), or the like.

The image capturing apparatus 501 includes, as hardware configuration, a memory 615, a CPU 616, an image capturing unit 611, a signal processing unit 612, a driving control unit 613, and a communication control unit 614.

The memory 615 is a storage unit that stores a program, set data, and so on. The CPU 616 is a central processing unit that controls the process of the image capturing apparatus 501. The function of the image capturing apparatus 501 is implemented by the CPU 616 executing the process based on the program stored in the memory 615. The image capturing unit 611 includes an image sensor and an optical system that forms an image of an object on the image sensor and forms the image on the image sensor, with the intersection of the optical axis of the optical system and the image sensor as the imaging center. Examples of the image sensor include a complementary metal-oxide semiconductor (CMOS) and a charged coupled device (CCD). The signal processing unit 612 processes an image signal captured by the image capturing unit 611. The signal processing unit 612 codes the image captured by the image capturing unit 611. An example coding system is the joint photographic experts group (JPEG). Another coding system can use H.264/MPEG-4AVC (hereinafter referred to as H.264). Still another coding system can use the high efficiency video coding (HEVC) system. These coding systems are provided merely for illustrative purposes, and are not seen to limit the scope of the present disclosure. The signal processing unit 612 can use a coding system selected from a plurality of coding systems. The driving control unit 613 controls changing the image capturing direction and the angle of view of the image capturing unit 611. In the present embodiment, the image capturing unit 611 can change the image capturing direction in a pan direction and a tilt direction and the image capturing angle of view, but is not limited thereto. The image capturing apparatus 501 optionally includes the function of changing a pan direction and a tilt direction and the function of changing the angle of view. The communication control unit 614 transmits the captured image processed by the signal processing unit 612 to the information processing apparatus 10. The communication control unit 614 receives a control command to the image capturing apparatus 501 from the information processing apparatus 10.

FIG. 8 is a flowchart illustrating an example of the information processing of the second embodiment.

The process of the flowchart in FIG. 8 is started, for example, when the waiting-time measuring system is started.

In S701, the setting unit 504 sets set conditions, such as the timing of measurement of waiting time and display timing, a passage detection line, and a count area, which are input via one or both of the input device 20 and the display device 30. In the case where the set conditions are stored in advance in the memory 11 or the like, the setting unit 504 reads and sets the set conditions stored in the memory 11 or the like.

In S702, the counting unit 503 determines whether the set timing for counting has come. For example, if the counting unit 503 determines that the set timing has come (S702: YES), the process proceeds to S703, and if the set timing has not yet come (S702: NO), the process proceeds to S705.

In S703, the counting unit 503 counts objects in the target area.

In S704, the queue-situation storing and waiting-time calculating unit 505 compares the number of arrival times stored in a waiting-line array stored therein and the number of objects counted by the counting unit 503. When the number of arrival times is less than the count, the queue-situation storing and waiting-time calculating unit 505 executes the following process. Since there are objects that have arrived, the queue-situation storing and waiting-time calculating unit 505 adds arrival times determined based on the time when the objects are counted to the end of the waiting-line array by the difference between the number of arrival times stored in the waiting-line array and the count. Thus, the preceding arrival times are stored in the waiting-line array in order from the top.

When the number of arrival times is equal to the count, the queue-situation storing and waiting-time calculating unit 505 determines that there is no new arrived object and performs no processing.

It is also possible that persons overlap, for example, in a queue waiting for a taxi, so that the objects in the queue cannot be correctly counted, or a person falls out of the queue. In such a case, when the count is less than the number of arrival times stored in the waiting-line array, the queue-situation storing and waiting-time calculating unit 505 executes the following process. The queue-situation storing and waiting-time calculating unit 505 deletes the arrival times stored in the waiting-line array or adds deletion candidate identification flags by the number corresponding to the number less than the number of arrival times. The queue-situation storing and waiting-time calculating unit 505 can delete or add the deletion-candidate identification flags from the last arrival time or the temporally closer arrival times.

When the deletion-candidate identification flag is attached, the queue-situation storing and waiting-time calculating unit 505 compares the count and the total number of arrival times without the deletion-candidate identification flag. If the count number is larger, the queue-situation storing and waiting-time calculating unit 505 removes deletion-candidate identification flags corresponding to the greater numbers. When the number of deletion-candidate identification flags to be removed is less than the number, the queue-situation storing and waiting-time calculating unit 505 adds arrival times to the last of the waiting-line array. The order of removing the deletion-candidate identification flags is opposite to the order of adding the deletion-candidate identification flags.

The process of S704 is an example of a process of storing the time when an object enters the waiting line in an array corresponding to the objects queuing in the waiting line.

In S705, the exiting detecting unit 502 determines whether the passage of an object has been detected. If the exiting detecting unit 502 detects the passage of an object (S705: YES), the process proceeds to S706, and if not (S705: NO), the process proceeds to S709. In S706, the queue-situation storing and waiting-time calculating unit 505 determines that the first object in the waiting-line array that arrived at count time (T1) has exited and sets the detection time as exit time (T2). The queue-situation storing and waiting-time calculating unit 505 calculates T2−T1 to obtain the waiting time of the object that arrived at time T1 and advances the waiting time in sequence.

When the deletion-candidate identification flag is attached to the first arrival time in the waiting-line array, the queue-situation storing and waiting-time calculating unit 505 determines that the arrival time has been deleted and that the second arrival time is the first arrival time and calculates the waiting time.

The process in S706 is an example of a first determination process for determining, when an object exiting the waiting line is detected, the time when the object exited the waiting line. The process in S706 is a second determination process for determining, when an object exiting the waiting line is detected, the time when the object exiting the waiting line entered the waiting line from the arrival time stored in the waiting-line array and determining the waiting time of the object in the waiting line from the time when the object enters the waiting line and the time when the object exited the waiting line.

In S707, the display unit 507 displays the waiting time obtained in S706 on the display device 30 or the like. The display unit 507 processes the waiting time in chronological order and displays the waiting time. The process in S707 is an example of a process of outputting the determined waiting time of the object in the waiting line.

In S708, the communicating unit 506 determines whether to transmit the waiting time obtained in S706 to an external device based on the set information stored in the memory 11, a request from the external device, and so on. When the communicating unit 506 determines to transmit the waiting time obtained in S706 to the external device, then the communicating unit 106 transmits the waiting time via the NIC 13. For example, the external device displays information on the received waiting time or the like on a display of the external device.

The process in S708 is an example of the process of outputting the determined waiting time of the object in the waiting line.

In S709, the queue-situation storing and waiting-time calculating unit 505 determines whether to terminate the process of estimating the waiting time. If the queue-situation storing and waiting-time calculating unit 505 performs the process of calculating the waiting time as needed (S709: NO), the process returns to S702, and if the queue-situation storing and waiting-time calculating unit 505 terminates the process of calculating the waiting time (S709: YES), the process in FIG. 8 ends.

While steps S703, S704, S706, and S707 have been described as a series of processes, this is not intended to limit the present disclosure. For example, the process from S703 to S704 and the process from S706 to S707 can be performed in parallel. For example, in S704, the queue-situation storing and waiting-time calculating unit 505 executes the process illustrated in FIGS. 9A to 9F and FIGS. 10A to 10F (described below) based on information stored in a database, a file, or the like. In S706, the queue-situation storing and waiting-time calculating unit 505 calculates waiting time. The communicating unit 506 or the display unit 507 can respectively transmit or display the calculated waiting time and so on.

Next, an example of the operation of the waiting-time measuring system when the process of the flowchart in FIG. 8 is executed will be described.

Also in present embodiment, the process of the waiting-time measuring system will be described using an example in which it is applied to a waiting line queuing at a taxi stand, as in FIGS. 4A and 4B.

FIGS. 9A to 9F and FIGS. 10A to 10F are diagrams illustrating an example in which the process of the waiting-time measuring system is applied to a waiting line queuing at a taxi stand.

For example, as illustrated in FIG. 9A, the number of objects in the waiting line counted at the first count time (11:00:30) reaches eight, and the arrival times of seven objects are stored in the waiting-line array in FIG. 9B. In this case, the queue-situation storing and waiting-time calculating unit 505 stores an arrival time (11:00:15) determined from the count time at the end of the waiting-line array, as illustrated in FIG. 9C.

Next, as illustrated in FIG. 9D, the exiting detecting unit 502 detects exiting at 11:00:35. At that time, the queue-situation storing and waiting-time calculating unit 505 assumes that the first object arrived at 10:57:45 in the waiting-line array in FIG. 9C exited and calculates that the waiting time is 2 minutes and 50 seconds. The queue-situation storing and waiting-time calculating unit 505 deletes the first data in the waiting-line array to advance the data sequentially into the waiting-line array as in FIG. 9E.

When the count at 11:01:00 is seven, the queue-situation storing and waiting-time calculating unit 505 does not change the waiting-line array because the waiting-line array in FIG. 9E contains columns corresponding to seven objects.

Next, assume that the count at 11:01:30 is 5 as illustrated in FIG. 10A, and the waiting-line array at that time is as illustrated in FIG. 10B. In this case, there is a possibility that objects overlap or objects fall out of the queue because the number of objects is small. Therefore, the queue-situation storing and waiting-time calculating unit 505 changes two deletion identification flags from 0 to 1 to form five arrival times including a deletion identification flag of 0 to match the number of columns to the number of objects. At that time, for example, the queue-situation storing and waiting-time calculating unit 505 changes the deletion identification flags of high-density arrival times and the latest arrival times in the waiting line to 1.

Assume that the count at 11:02:00 thereafter is 6, as in FIG. 10C. Since the total number of arrival times is one less than the count, the queue-situation storing and waiting-time calculating unit 505 changes the deletion identification flag of the older arrival time from 1 to 0 to form six arrival times having a deletion identification flag of 0, as in FIG. 10D.

Assume that the count at 11:02:30 is 8, as in FIG. 10E. The waiting-line array at that time contains six arrival times with a deletion identification flag of 0, as in FIG. 10D. Therefore, even if the deletion identification flag of 1 is returned to 0, the columns in the array are one less than the waiting objects. Therefore, the queue-situation storing and waiting-time calculating unit 505 adds an arrival time of one object, as in 10F.

When exiting is detected in the case where an arrival time with a deletion identification flag is at the head of the waiting-line array, the queue-situation storing and waiting-time calculating unit 505 assumes that the head arrival time is not present and that an object at the second arrival time has exited.

Figure 11A:
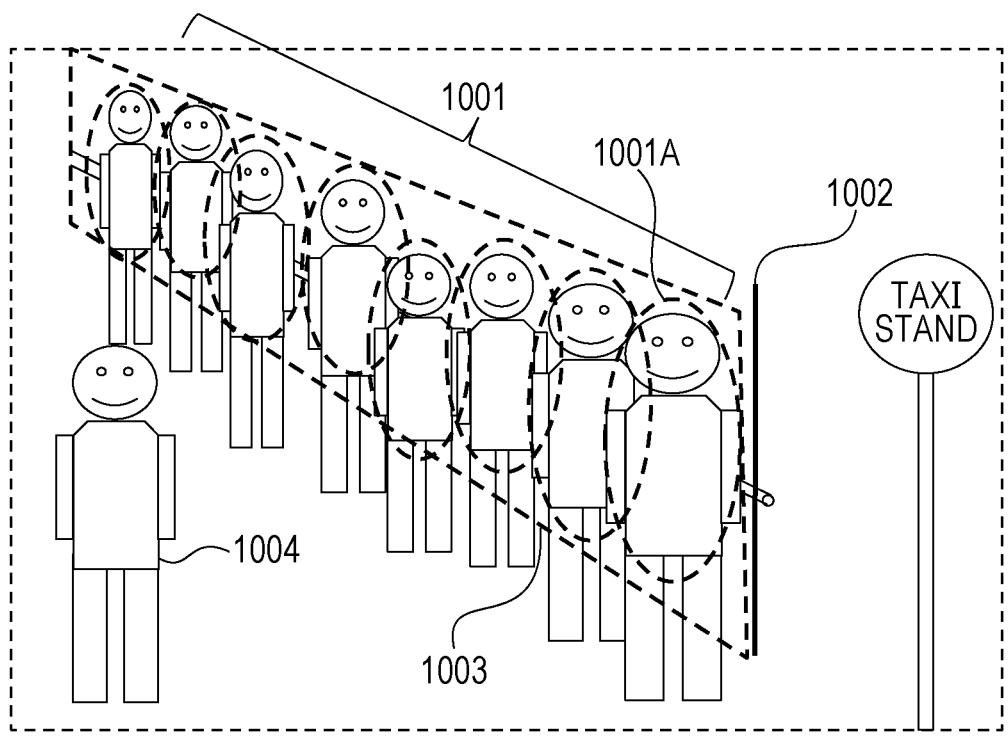
FIG. 11A is a diagram illustrating an example of the setting of a waiting-time measuring system of a third embodiment.
Figure 11B:
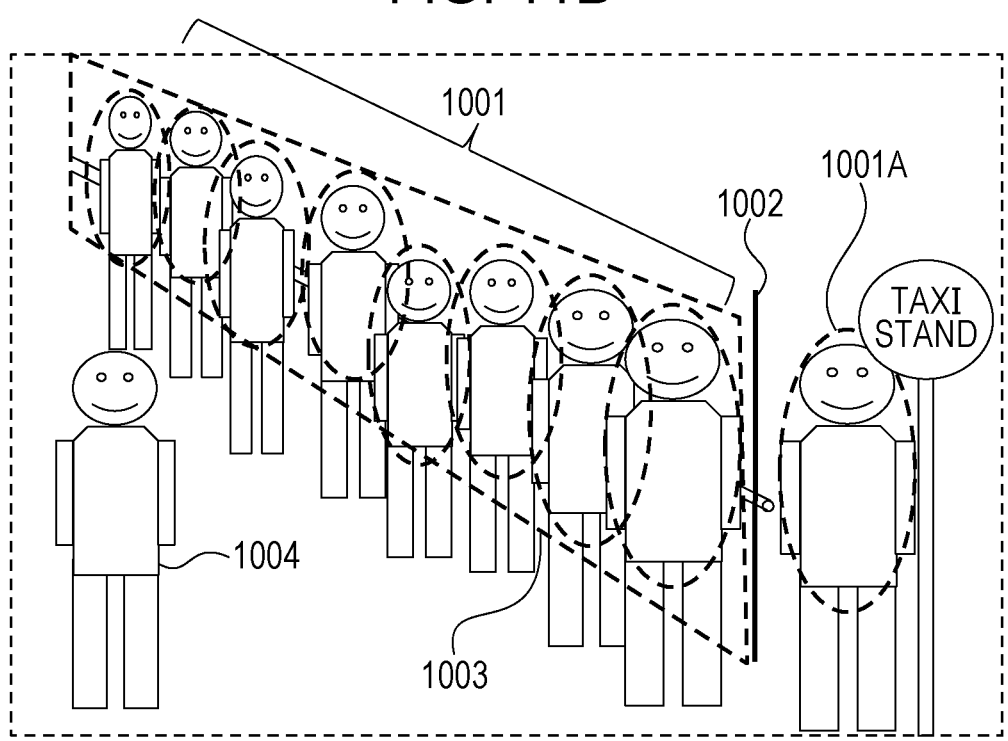
FIG. 11B is a diagram illustrating an example of the setting of the waiting-time measuring system of the third embodiment.

FIGS. 11A and 11B are diagrams of examples of images of a queue waiting for a taxi captured by the image capturing apparatus 501, the images being analyzed into images on which a detected human body frame 1001 is superimposed based on the central positions and sizes detected as the upper bodies of the human bodies.

A passage detection line 1002 is set at a portion where arrival or exiting is to be detected. For example, in S701, the setting unit 504 sets the passage detection line 1002 on the image based on a user operation via a graphical user interface (GUI) or the like.

In S703, the counting unit 503 counts the number of detected human bodies in this place from the images of FIGS. 11A and 11B.

When the number of objects is counted using the image from the image capturing apparatus 501, a count area 1003 can be set to measure the waiting time to distinguish the detection objects from a passerby 1004.

When a person detected as a detected human body frame 1001A moves forward to get into a taxi, as illustrated in FIG. 11B, the exiting detecting unit 502 performs the following process in S705. The exiting detecting unit 502 determines whether the detected person has passed through the passage detection line 1002 based on the change in position and size of the same human body from the analysis result using an image frame at the immediately preceding time.

Third Embodiment

In the first and second embodiments, an area in which there is only one taxi stand and that can be captured by a single camera is described. In the case where there are a plurality of taxi stands, the waiting time can be obtained by individually executing passage detection. Even for a wide area, the waiting time can be measured by counting the objects in each area and totaling them.

Figure 12:
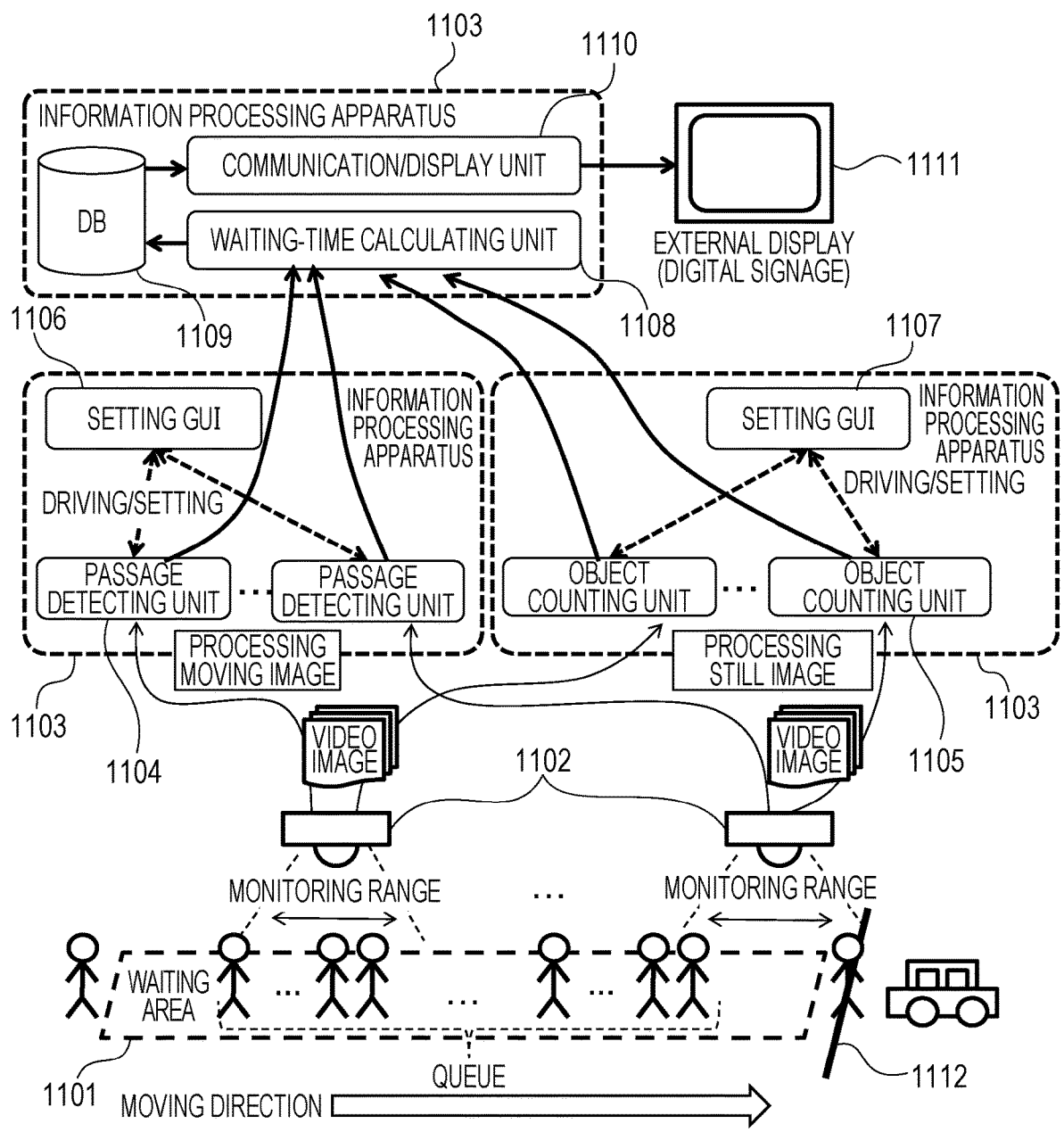
FIG. 12 is a diagram illustrating an example of the configuration of a waiting-time measuring system of a third embodiment.

Even for a complicated area, the waiting time can be measured using a combination of the above processes, for example, a waiting-time measuring system illustrated in FIG. 12.

Since the hardware configuration of information processing apparatuses 1103 is the same as the hardware configuration of the information processing apparatus 10 in FIG. 1, its description will be omitted herein. The function and so on of each information processing apparatus 1103 is implemented by the CPU of the respective information processing apparatus 1103 executing a program stored in the memory or the like of the information processing apparatus 1103.

Images of the waiting line in a taxi waiting area 1101 are captured by a plurality of cameras 1102.

The images from the plurality of cameras 1102 are analyzed by passage detecting units 1104 in the information processing apparatus 1103. When passage is detected by the passage detecting units 1104, the time is notified to a waiting-time measuring unit 1108. When using the images from the cameras 1102, the passage detecting units 1104 detect whether a person has passed through a passage detection line set via a passage-detection setting GUI 1106 based on information on the passage detection line. The passage detecting units 1104 process the individual frames of a moving image and associate the detected human bodies in the frames to detect whether the same person has passed through the passage detection line. When images from the plurality of cameras 1102 are processed, one or a plurality of information processing apparatuses 1103 can be used based on the functions of the information processing apparatuses. The process can be performed by the cameras 1102, and detected information can be transmitted to the information processing apparatuses 1103.

Object counting units 1105 perform a process that counts the total number of persons in the queue based on information, such as count areas and process timing set with an object count setting GUI 1107. The object counting units 1105 count the objects using images from one or a plurality of cameras 1102 based on the situation of the taxi waiting area. The object counting does not necessarily need to be performed using moving images, and can be performed using still images captured at a timing based on the set update timing. This enables increasing the number of cameras that can be processed for counting by a single information processing apparatus 1103. In this case, the plurality of information processing apparatuses 1103 acquire the images from the cameras 1102 at the same time, as illustrated in FIG. 12, and sequentially process the timing of starting analysis processing. This prevents the same moving person in the queue from being imaged by different cameras and being counted multiple times. As a result, the CPUs of the information processing apparatuses 1103 can be effectively used.

The waiting-time measuring unit 1108 performs the process of calculating the waiting time based on the process in the flowchart illustrated in FIG. 8.

When a plurality of cameras 1102 are used, it is important to synchronize the timing of capturing the images to be counted. The measured waiting time is stored in the memory 11 or the like in the form of a database 1109 or a comma separated value (CSV) file. A communication/display unit 1110 transmits the measured waiting time to another terminal (an external display 1111) or displays it on a display unit in each information processing apparatus 1103. The database 1109 can store the waiting time as well as the detected passage time, the result of object counting, and so on. The data and the result of counting can be displayed on the display unit of each information processing apparatus 1103. The time period for counting can be set on the information processing apparatuses 1103 from an external device.

These waiting times are totaled up and graphed as appropriate and can be used for arrangement of staffs and so on.

Two or more areas for object counting can be set. In the case where a camera is disposed to image a plurality of entrances, the information processing apparatuses 1103 can set a plurality of passage positions to detect individual passages and operate the waiting-line array each time.

Figure 13A:
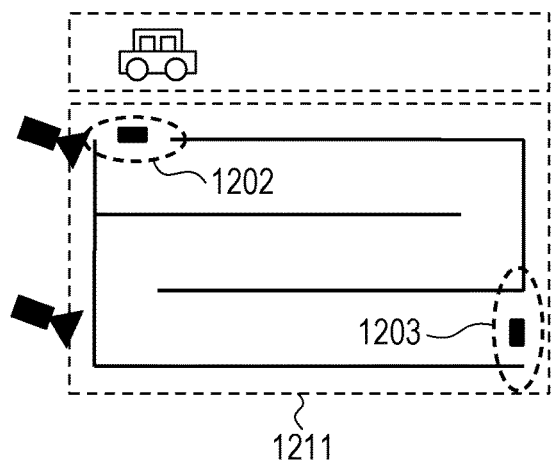
FIG. 13A is a diagram illustrating an application of the waiting-time measuring system of the third embodiment.
Figure 13B:
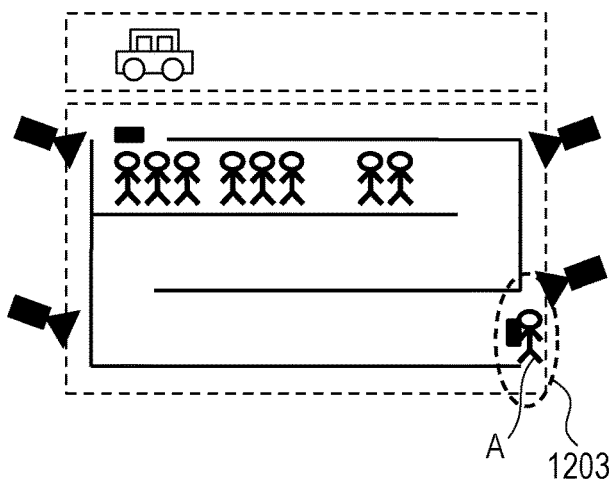
FIG. 13B is a diagram illustrating an application of the waiting-time measuring system of the third embodiment.
Figure 13C:
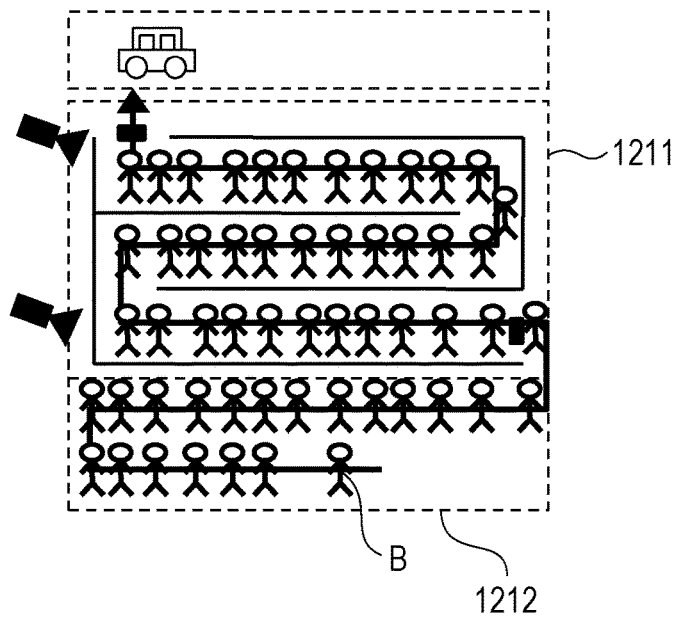
FIG. 13C is a diagram illustrating an application of the waiting-time measuring system of the third embodiment.

The above process can also be performed in the case where the entrance 1203 and the exit 1202 of a queue area 1211 are fixed, as illustrated in FIGS. 13A to 13C, and passage can be detected, but persons are queuing in an area 1212 following the queue area 1211, as in FIG. 13C, so that the time of arrival at the waiting line cannot be specified.

Figure 14:
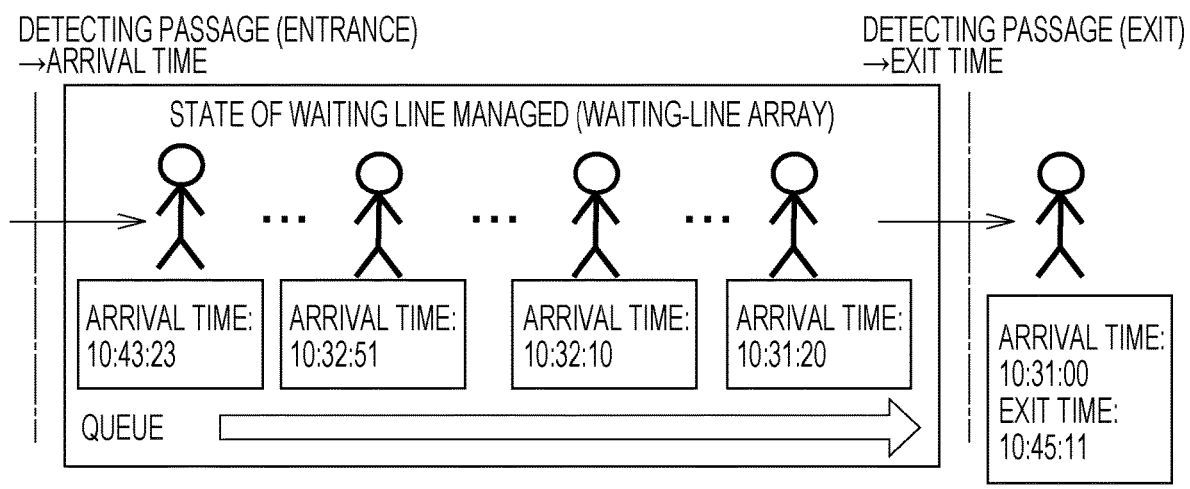
FIG. 14 is a diagram illustrating an example of the internal array of the waiting-time measuring system of the third embodiment.

In this case, when no persons are overflowing from the entrance 1203, as in FIG. 13B, the information processing apparatus can store the arrival time as the time of detection of the passage at the entrance 1203, as illustrated in FIG. 14. In the case where persons are overflowing from the entrance 1203, the information processing apparatus can perform the process of the flowchart illustrated in FIG. 8.

The above process enables accurate measurement of the waiting time at facilities where the service time is not fixed, such as taxi stands, restaurants, checkout counters at stores, airport counters, and security check areas. There is no need to input individual customer information at the time of entry or receipt etc., because all the images are analyzed. Even when there are a plurality of entrances or windows, measurement of waiting time can be accurately performed.

In the case where it is necessary to obtain a waiting time every predetermined time period, the average of all the persons can be taken or the waiting time of one representative person can be obtained. In this case, if no person has passed during the time period, the value of the closest person of the passers in the time period before and after can be used, the simple average or weighted average can be taken, or the value of the preceding passer can be used.

According to the above embodiments, the waiting time of a waiting line can be accurately measured.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095725 filed May 12, 2017, which is hereby incorporated by reference herein in its entirety.

What is claimed is:

1. An information processing apparatus comprising:
   a counting unit configured to count a number of objects in a waiting line;
   a storing unit configured to store a first estimated timing at which a target object enters the waiting line, wherein the first estimated timing is estimated based on a timing at which the number of objects is counted by the counting unit;
   measuring unit configured to measure, as a waiting time of the target object in the waiting line, a period from the first estimated timing to a second estimated timing, wherein the second estimated timing is a timing at which a number of objects, which exited the waiting line after the first estimated timing, has reached the number of objects in the waiting line corresponding to a state where the target object had entered the waiting line.

2. The information processing apparatus according to claim 1, further comprising an output unit configured to output the waiting time of the target object in the waiting line.

3. The information processing apparatus according to claim 1, further comprising:
   a detecting unit configured to detect an object exiting the waiting line,
   wherein the second estimated timing is a timing at which a number of objects detected by the detection unit after the first estimated timing has reached the number of objects which were in the waiting line in a state where the target object had entered the waiting line.

4. The information processing apparatus according to claim 1, further comprising an estimation unit configured to estimate the first estimated timing, based on a first timing at which the number of objects in the waiting line just after the target object has entered the waiting line is counted by the counting unit.

5. The information processing apparatus according to claim 4, wherein the first estimated timing is a given timing between the first timing and a second timing, the second timing being a timing at which number of objects in the waiting line just before the target object enters the waiting line is counted by the counting unit.

6. The information processing apparatus according to claim 1, wherein the second estimated timing is a timing at which the number of objects, which exited the waiting line after the first estimated timing, has reached the number of objects which were in the waiting line just after the target object had entered the waiting line.

7. The information processing apparatus according to claim 1, wherein the counting unit is configured to count the number of objects in the waiting line at a predetermined interval.

8. An information processing method comprising:
   counting a number of objects queuing in a waiting line;

storing a first estimated timing at which a target object enters the waiting line, wherein the first estimated timing is estimated based on a timing at which the number of objects is counted in the counting; and measuring, as a waiting time of the target object in the waiting line, a period from the first estimated timing to a second estimated timing, wherein the second estimated timing is a timing at which a number of objects, which exited the waiting line after the first estimated timing, has reached the number of objects in the waiting line corresponding to a state where the target object had entered the waiting line.

9. The information processing method according to claim 8, further comprising outputting the waiting time of the target object in the waiting line.

10. The information processing method according to claim 8, further comprising:

detecting an object exiting the waiting line, wherein the second estimated timing is a timing at which a number of objects detected in the detecting after the first estimated timing has reached the number of objects which were in the waiting line in a state where the target object had entered the waiting line.

11. The information processing method according to claim 8, further comprising estimating the first estimated timing, based on a first timing at which the number of objects in the waiting line just after the target object has entered the waiting line is counted in the counting.

12. The information processing method according to claim 11, wherein the first estimated timing is a given timing between the first timing and a second timing, the second timing being a timing at which number of objects in the waiting line just before the target object enters the waiting line is counted in the counting.

13. The information processing method according to claim 8, wherein the second estimated timing is a timing at which the number of objects, which exited the waiting line after the first estimated timing, has reached the number of objects which were in the waiting line just after the target object has entered the waiting line.

14. The information processing method according to claim 8, wherein the counting counts the number of objects in the waiting line at a predetermined interval.

15. A non-transitory computer-readable storage medium storing a program for causing a computer to execute a method, the method comprising:

counting a number of objects in a waiting line;

storing a first estimated timing at which a target object enters the waiting line, wherein the first estimated timing is estimated based on a timing at which the number of the objects is counted in the counting; and measuring, as a waiting time of the target object in the waiting line, a period from the first estimated timing to a second estimated timing, wherein the second estimated timing is a timing at which a number of objects, which exited the waiting line after the first estimated timing, has reached the number of objects in the waiting line corresponding to a state where the target object had entered the waiting line.

* * * * *